US012582091B1

(12) United States Patent
    Diedrichsen

(10) Patent No.: US 12,582,091 B1
(45) Date of Patent: Mar. 24, 2026

(54) FEEDER PORT SYSTEM

(71) Applicant: Erik Joseph Diedrichsen, West Bridgewater, MA (US)

(72) Inventor: Erik Joseph Diedrichsen, West Bridgewater, MA (US)

( * ) Notice: Subject to any disclaimer, the term of this patent is extended or adjusted under 35 U.S.C. 154(b) by 0 days.

(21) Appl. No.: 19/189,221

(22) Filed: Apr. 24, 2025

Related U.S. Application Data

(63) Continuation-in-part of application No. 19/081,558, filed on Mar. 17, 2025.

(51) Int. Cl.
    A01K 5/02      (2006.01)
    A01K 39/01     (2006.01)
(52) U.S. Cl.
    CPC .......... A01K 5/025 (2013.01); A01K 39/0113 (2013.01)
(58) Field of Classification Search
    CPC .............................. A01K 5/02; A01K 39/0113
    See application file for complete search history.

(56) References Cited

U.S. PATENT DOCUMENTS

| | | | | |
|---|---|---|---|---|
| 914,720 | A | * | 3/1909 | Harper ............... A01K 39/0113 |
| 5,048,461 | A | * | 9/1991 | Wessner ................. A01K 39/00 |
| | | | | 119/52.3 |
| 9,832,974 | B1 | * | 12/2017 | Miedel ................... A01K 15/02 |
| 12,150,432 | B1 | * | 11/2024 | Van Delden ............. A01K 5/02 |
| 2001/0032594 | A1 | * | 10/2001 | Bickley .................... A01K 5/01 |
| 2012/0037080 | A1 | * | 2/2012 | Hepp ..................... A01K 39/01 |
| | | | | 119/52.3 |
| 2017/0142929 | A1 | * | 5/2017 | Poche ..................... A01M 5/02 |
| 2018/0098532 | A1 | * | 4/2018 | Poche ................... A01M 25/00 |

* cited by examiner

*Primary Examiner* — Joshua J Michener
*Assistant Examiner* — Henry Hooper Mudd
(74) *Attorney, Agent, or Firm* — Wilson Dutra, PLLC; Camille A. Wilson

(57) ABSTRACT

The present disclosure provides a feeder port system with a tubular body. In some embodiments, feeder port may include a tubular body with an entry portion and an exit portion. In some aspects, the feeder port may include a collar and an external threading. In some implementations, the feeder port system may include a gate mechanism configured to provide and deny access to the entry portion of the feeder port. In some aspects, the feeder port system may include a support structure, a sliding door, and a platform. In some aspects, the feeder port system may be configured to provide access for farm animals to consume feed while blocking access to rodents and pests.

18 Claims, 15 Drawing Sheets

100

115

130

110

150

140

120

300

640

610

630

620

600

800

855

805

815

815

840

830

810

850

1000

1500

1530

1520

1510

1540

1550

FEEDER PORT SYSTEM

CROSS-REFERENCE TO RELATED APPLICATIONS

This application is a continuation-in-part and claims priority to and the full benefit of pending U.S. Non-Provisional application Ser. No. 19/081,558 (filed Mar. 17, 2025, and titled "FEEDER PORT"), the entire contents of which are incorporated in this application by reference, which claimed priority to and full benefit of pending U.S. Design patent application Ser. No. 29/966,335 (filed Oct. 1, 2024, and titled "COLLAR FOR POULTRY FEEDER"), the entire contents of which are incorporated in this application by reference, which claimed priority to and the full benefit of pending U.S. Design patent application Ser. No. 29/965,977 (filed Sep. 30, 2024, and titled "COLLAR FOR POULTRY FEEDER"), the entire contents of which are incorporated in this application by reference, which claimed priority to and the full benefit of pending U.S. Design patent application Ser. No. 29/966,004 (filed Sep. 30, 2024, and titled "POULTRY FEEDER"), the entire contents of which are incorporated in this application by reference, which claimed priority to and the full benefit of pending U.S. Design patent application Ser. No. 29/965,998 (filed Sep. 30, 2024, and titled "POULTRY FEEDER"), the entire contents of which are incorporated in this application by reference, which claimed priority to and the full benefit of patented U.S. Design patent application Ser. No. 29/946,487 (D1064430) (filed Jun. 8, 2024, and titled "POULTRY FEEDER"), the entire contents of which are incorporated in this application by reference, which claimed priority to and the full benefit of U.S. Design patent application Ser. No. 29/913,827 (D1031181) (filed Oct. 10, 2023, and titled "POULTRY FEEDER"), the entire contents of which are incorporated in this application by reference, which claimed priority to and the full benefit of U.S. Design patent application Ser. No. 29/913,818 (D1021277) (filed Oct. 10, 2023, and titled "POULTRY FEEDER"), the entire contents of which are incorporated in this application by reference, which claimed priority to and the full benefit of U.S. Design patent application Ser. No. 29/735,857 (D1014867) (filed May 26, 2020, and titled "POULTRY FEEDER WITH INTERNAL CONNECTOR"), the entire contents of which are incorporated in this application by reference.

BACKGROUND

Feeders have been used for centuries to hold food or water in organized containers accessible to livestock. These feeders have allowed farmers to efficiently and effectively feed large quantities of livestock in a single location. There are a variety of different types of feeders such as trough feeders, bunk feeders, hay feeders, creep feeders, and poultry feeders. Despite their differences, these feeders share common challenges involving rodents, pests, and insects.

These rodents, pests, and insects access feeders through large openings or insufficient barriers. When this occurs, the feeds are susceptible to contamination, disease transmission, and the loss of feed. This not only endangers the health and productivity of the livestock but may also result in significant economic loss. While there have been many attempts to resolve this issue, it has largely persisted and continues to be an issue for farmers and livestock owners alike. In addition, many of the solutions that have been used to address rodents, pests, and insects can be expensive and difficult to implement.

What is needed is a way to reduce the access of rodents, pests, and insects to feeders while maintaining ease of access for the intended animals. If the design of the access point to the feeder is designed in a way that restrict usage exclusively to the intended livestock, it may lead to a number of benefits. This may be further benefitted from a mechanism configured to prevent access to the feeder for rodents. For example, the feeder may include a door or panel that may open or close if certain conditions are met. This may discriminate against the entry of rodents, preventing them from accessing the feeder, even if they are able to climb towards the entrance of the feeder. If there was a way to have more control over feeder accessibility, it may result in lower costs, improved health of livestock, and feeding efficiency.

SUMMARY OF THE DISCLOSURE

What is needed is a feeder port configured to provide easy access to food while limiting pests, rodents, and insects from entering. In some embodiments, the feeder port may include a tubular body and may include a rigid material.

In some embodiments, the feeder port may include an internal cavity that may extend through the tubular body, wherein the tubular body may include a first base and a second base. In some aspects, the feeder port may include an entry portion at the first base of the tubular body with an outwardly flared lip that may provide access into the internal cavity of the tubular body. In some implementations, the feeder tube may include an exit portion that may be perpendicular to the second base configured to provide a downward facing exit out of the internal cavity of the tubular body, wherein the internal cavity may extend from the entry portion to the exit portion. In some aspects, the feeder port may include a collar that may protrude around the tubular body between the entry portion and the exit portion. In some implementations, the feeder port may include external threading on the tubular body between the collar and the exit portion, wherein the external threading may be configured to receive a bushing.

In some embodiments, a gate mechanism may be connectable to the feeder port, wherein the gate mechanism is configured to provide and deny access to the entry portion of a feeder port. In some implementations, the gate mechanism may include a support structure that is vertically oriented with an opening to connect to the collar of the feeder port, wherein the support structure may include one or more stabilizing mechanisms, and one or more tracks may be configured to receive a sliding door. In some aspects, the gate mechanism may include a sliding door attachable to the one or more tracks, wherein the sliding door may be configured to allow and block access to the feeder port.

In some embodiments, the gate mechanism may include a pressure mechanism attachable to the sliding door, wherein pressing the pressure mechanism may be configured to move the sliding door downwards on the one or more tracks to allow access into the feeder port.

A number of embodiments of the present disclosure will be described. While this specification contains many specific implementation details, these should not be construed as limitations on the scope of any disclosures or of what may be claimed, but rather as descriptions of features specific to particular embodiments of the present disclosure. It is understood to those skilled in the art that variations, modifications, and alterations may be apparent. It will be understood that various modifications may be made without departing from the spirit and scope of the disclosure.

BRIEF DESCRIPTION OF THE DRAWINGS

The accompanying drawings that are incorporated in and constitute a part of this specification illustrate several embodiments of the disclosure and, together with the description, serve to explain the principles of the disclosure.

Figure 1:
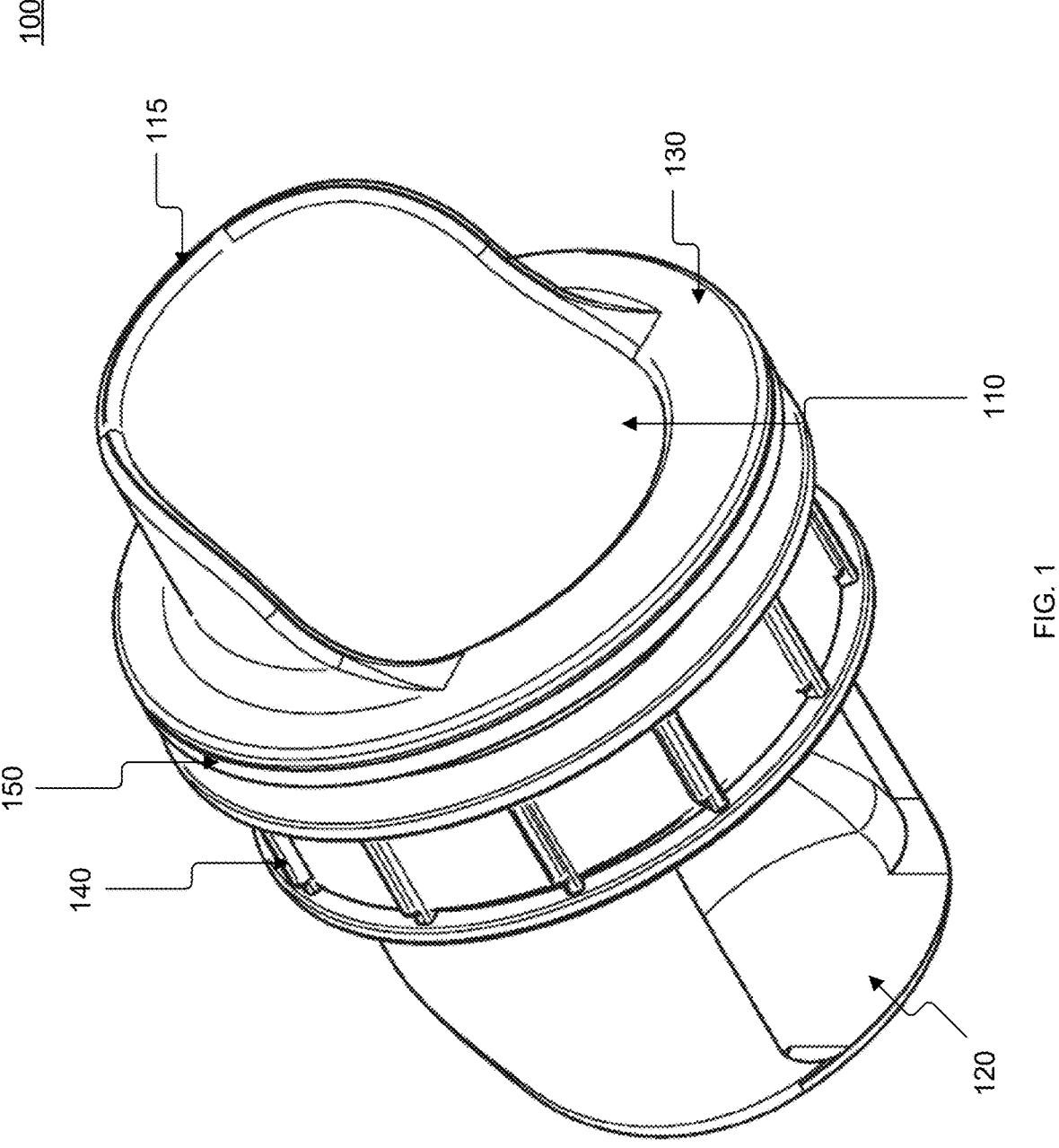
FIG. 1 illustrates an isometric view of a feeder port, according to some embodiments of the present disclosure.

The Figures are not necessarily drawn to scale, as their dimensions can be varied considerably without departing from the scope of the present disclosure.

DETAILED DESCRIPTION

The present disclosure provides generally for a feeder port. According to the present disclosure, a feeder port may be configured to connect to a feeder trough, wherein livestock or poultry may access the contents of the feeder trough with limited access to pests, rodents, and insects. In some embodiments, the feeder port may include an entry portion, an exit portion, a collar, an external threading, and a bushing, wherein the feeder port may be secured to the feeder trough.

In the following sections, detailed descriptions of examples and methods of the disclosure will be given. The description of both preferred and alternative examples, though thorough, are exemplary only, and it is understood to those skilled in the art that variations, modifications, and alterations may be apparent. It is therefore to be understood that the examples do not limit the broadness of the aspects of the underlying disclosure as defined by the claims.

Glossary

Feeder Port: as used herein refers to a device configured to provide limited access to a feeder trough. In some aspects, the feeder port may include an entry portion, an exit portion, a collar, and an external threading. In some implementations, a bushing may connect and secure the feeder port to the feeder trough at the external threading.

Collar: as used herein refers to a component of the feeder port that surrounds the tubular structure of the feeder port to prevent it from moving entirely through an aperture configured to receive the feeder port on the feeder trough.

Securing mechanism: as used herein refers to a device configured to secure the feeder port onto the feeder trough. By way of example and not limitation, the feeder trough may include screws, pins, adhesives, snaps, or caps.

Trough: as used herein refers to any container capable of holding feed for an animal. In some aspects, a trough may be a bucket, such as a 5-gallon bucket, as a non-limiting example.

Waterproof seal: as used herein refers to a seal that limits water, debris, wind, and other contaminants from entering the trough through the feeder port. Use of the term "waterproof" does not necessarily mean that no water penetrates the seal only that it limits fluids and debris from entering the trough.

Bushing: as used herein refers to any mechanism that secures the feeder port onto the trough through the body of the feeder port. For example, threaded bushing may tighten the location of the feeder port within the trough, independently or in conjunction with a securing mechanism.

Gate Mechanism: as used herein refers to a device connectable to a feeder port, wherein the gate mechanism may be configured to allow or prevent access to the feeder. In some aspects, the gate mechanism may include a sliding door, a support structure, and a pressure mechanism. By way of example and not limitation, the gate mechanism may prevent rodents and pests from accessing the feeder port.

Sliding door: as used herein refers to a portion of the gate mechanism configured as a movable panel that may be configured to block or provide access to an entry portion of a feeder port. In some aspects, the sliding door may be configured to move across one or more tracks of the gate mechanism.

Platform: as used herein refers to a portion of the gate mechanism coupled to the sliding door, wherein the pressure mechanism may provide leverage to move the sliding door in a position that provide access to an entry portion of a feeder port. In some aspects, the pressure mechanism may be a flat plate configured to receive force, wherein force received by the pressure mechanism may pull the sliding door in an open position.

Pulley mechanism: as used herein refers to a portion of the support structure attachable to a sliding door, wherein the pulley mechanism is configured to pull the sliding door into a closed position, wherein a pressure exerted upon a pressure mechanism must exceed the force of the pulley mechanism to provide access to a feeder port. In some aspects, the pulley mechanism may include rope, rubber, or plastic, as non-limiting examples.

Anchor mechanism: as used herein refers to a portion of the support structure configured to hold the pulley mechanism, wherein the pulley mechanism may wrap around the anchor mechanism.

Referring now to FIG. 1, an isometric view of a feeder port 100 according to some embodiments of the present disclosure, is illustrated. In some embodiments, the feeder port 100 may include a tubular body. In some aspects, the feeder port 100 may include an internal cavity that extends through the tubular body, wherein the tubular body has a first base and a second base.

In some implementations, the feeder port 100 may include an entry portion 110 at the first base of the tubular body and an exit portion 120. In some aspects, the entry portion 110 may include an outwardly flared lip 115 that provides access into the internal cavity of the tubular body. In some embodiments, the exit portion 120 may be perpendicular to the second base configured to provide an exit out of the internal cavity of the tubular body, wherein the internal cavity may extend from the entry portion to the exit portion. In some embodiments, the feeder port 100 may include a rigid material.

In some implementations, the feeder port 100 may include a collar 130 that protrudes around the tubular body between the entry portion 110 and the exit portion 120. In some aspects, the feeder port 100 may include an external threading on the tubular body between the collar 130 and the exit portion 120, wherein the external threading may be configured to receive a bushing 140. By way of example and not limitation, the bushing 140 may be configured to connect to the external threading, wherein the bushing 140 may screw onto or snap onto the external threading.

In some aspects, the collar 130 may provide a barrier to prevent the bushing 140 from moving beyond the external threading. In some implementations, a waterproof seal 150 may be included between the collar 130 and the external threading. In some aspects, the collar 130 and the external threading may secure the waterproof seal 150 in place.

In some embodiments, the feeder port 100 may be placed on a feeder, wherein the feeder port 100 may provide limited access into the feeder. By way of example and not limitation, the feeder may include a trough, wherein the trough may include an aperture configured to receive the feeder port 100. In some aspects, the exit portion 120 of the feeder port 100 may be placed into the aperture of the trough, wherein the collar 130 may provide a barrier from the entirety of the feeder port 100 from moving through the aperture of the trough. In some implementations, the entry portion 110 of the feeder port 100 may protrude out of the trough, whereas the exit portion 120 of the feeder port 100 may protrude into the trough, wherein the bushing 140 may be connected from the exit portion 120, wherein the bushing 140 secures the feeder port 100 onto the trough. In some embodiments, the waterproof seal 150 may be placed on the feeder port 100 from the exit portion 120 before the bushing 140, wherein the waterproof seal 150 prohibits anything from entering or exiting the trough from any point on the aperture of the trough other than the internal cavity of the feeder port 100.

By way of example and not limitation, the feeder port 100 may be placed on a trough with poultry feed. In some aspects, the poultry may access the poultry feed from the feeder port 100, wherein their beaks may fit through entry portion 110, the internal cavity, and the exit portion 120. In some implementations, the trough may be entirely closed off other than the entrance through the feeder port 100. By way of example and not limitation, the feeder port 100 may prevent pests, rodents, and insects from entering the trough.

Figure 2:
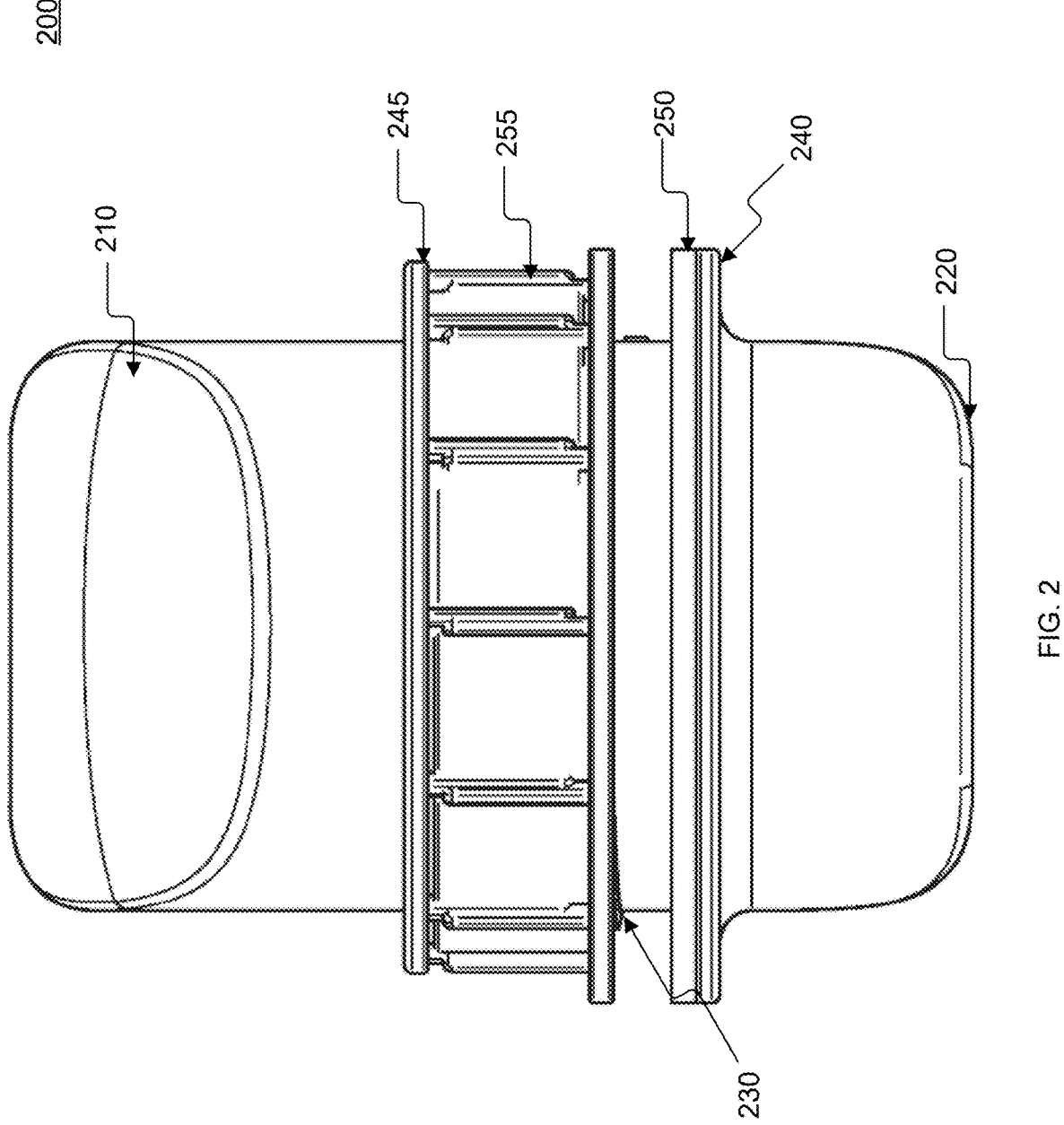
FIG. 2 illustrates a top view of a feeder port, according to some embodiments of the present disclosure.

Referring now to FIG. 2, a top view of a feeder port 200, according to some embodiments of the present disclosure, is illustrated. In some embodiments, the feeder port 200 may include a tubular body with an internal cavity, an entry portion 210, an exit portion 220, an external threading 230, and a collar 240. In some aspects, the feeder port 200 may include a waterproof seal 250 between the collar 240 and the external threading 230. In some implementations, a bushing 245 may be connected to the external threading 230, wherein the bushing 245 may be configured to secure the feeder port 200 in place. In some aspects, the feeder port 200 may include a rigid material.

In some implementations, the bushing 245 may include one or more ridges 255. By way of example and not limitation, the one or more ridges 255 may provide leverage to twist the bushing 245 on or off the external threading 230 of the feeder port 200. In some aspects, the space between the one or more ridges 255 may receive a user's fingers, as non-limiting examples, wherein the user may add or remove the bushing 245.

Figure 3:
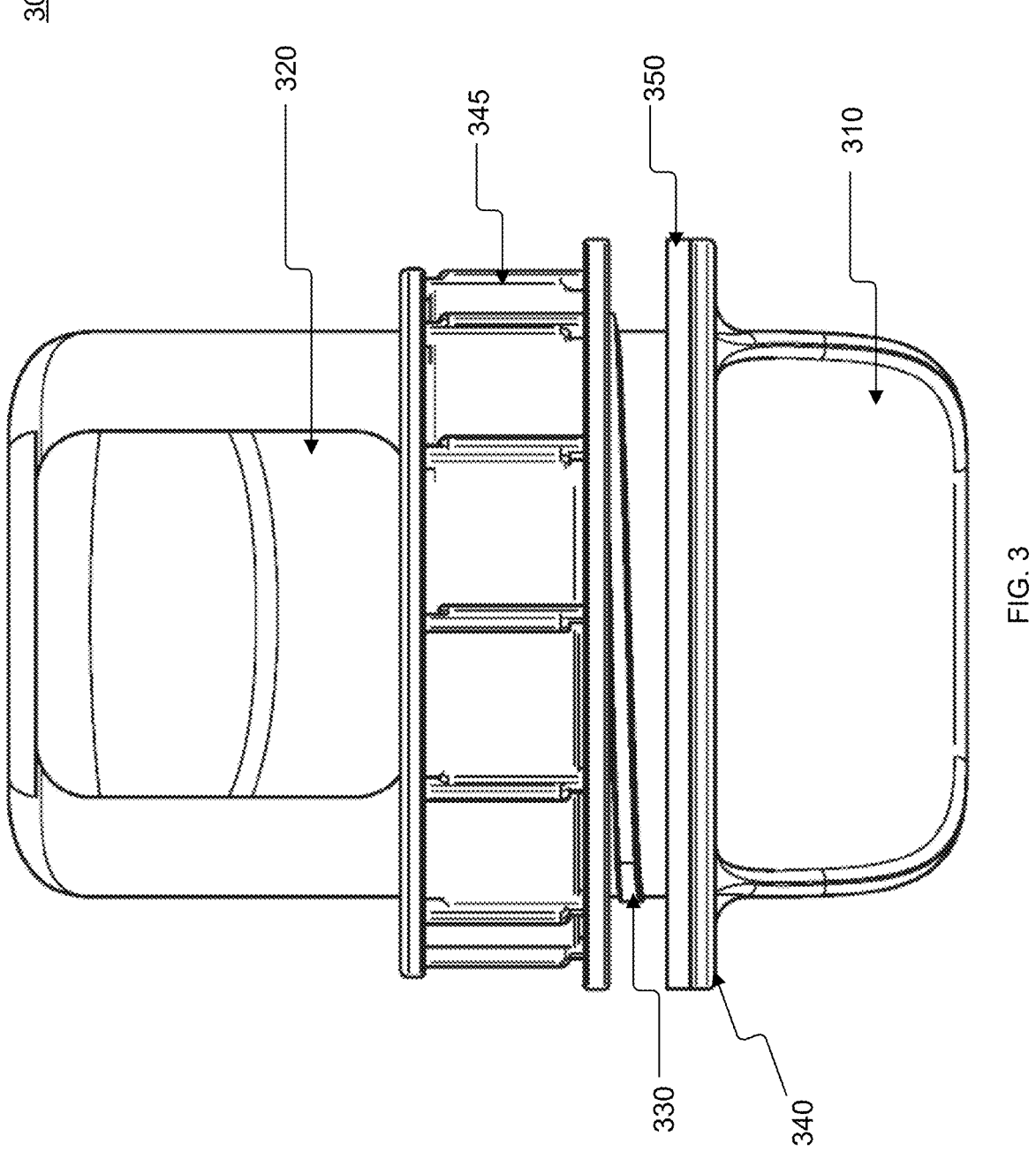
FIG. 3 illustrates a bottom view of a feeder port, according to some embodiments of the present disclosure.

Referring now to FIG. 3, a bottom view of a feeder port 300, according to some embodiments of the present disclosure, is illustrated. In some embodiments, the feeder port 300 may include a tubular body with an internal cavity, an entry portion 310, an exit portion 320, an external threading 330, and a collar 340. In some aspects, the feeder port 300 may include a waterproof seal 350 between the collar 340 and the external threading 330. In some implementations, a bushing 345 may be connected to the external threading 330, wherein the bushing 345 may be configured to secure the feeder port 300 in place. In some aspects, the feeder port 300 may include a rigid material.

In some embodiments, the exit portion 320 of the feeder port 300 may be configured to face downwards. In some aspects, the entry portion 310 of the feeder port 300 may be configured to one base of the tubular body, whereas the opposite base may be blocked off. In some implementations, the exit portion 320 may be configured to the side of the tubular body. By way of example and not limitation, a chicken may place their beak into the entry portion 310 and through the exit portion 320, wherein the downward facing nature of the exit portion 320 allows the chicken to access feed below the exit portion 320.

Figure 4:
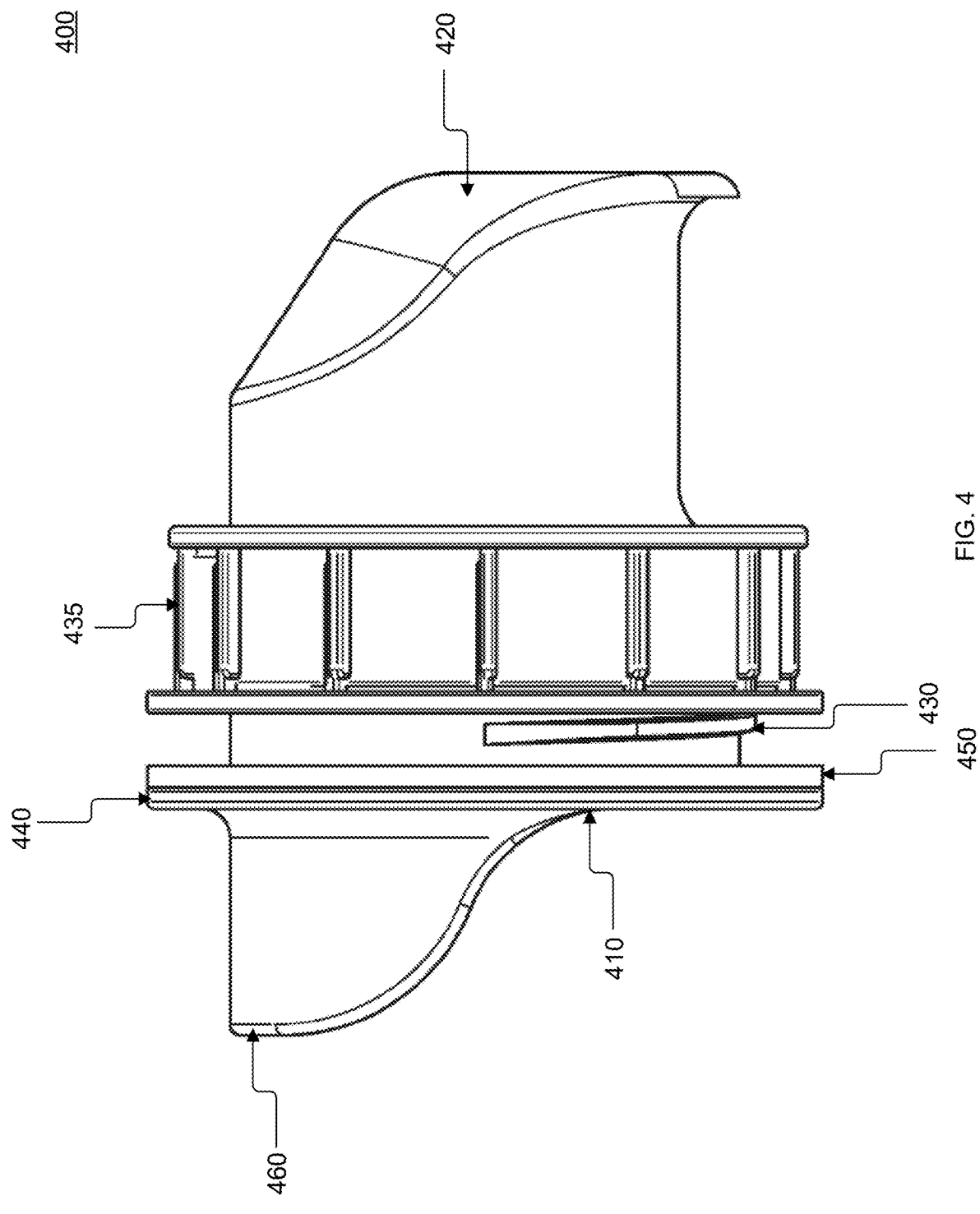
FIG. 4 illustrates a sideview of a feeder port, according to some embodiments of the present disclosure.

Referring now to FIG. 4, a side view of a feeder port 400, according to some embodiments of the present disclosure, is illustrated. In some embodiments, the feeder port 400 may include a tubular body with an internal cavity, an entry portion 410, an exit portion 420, an external threading 430, and a collar 440. In some aspects, the feeder port 400 may include a waterproof seal 450 between the collar 440 and the external threading 430. In some implementations, a bushing 435 may be connected to the external threading 430, wherein the bushing 435 may be configured to secure the feeder port 400 in place. In some aspects, the feeder port 400 may include a rigid material.

In some embodiments, the entry portion 410 may include an outwardly flared lip 460 that provides access into the internal cavity of the tubular body. By way of example and not limitation, a trough with poultry feed may include the feeder port 400 to provide access to the feed for poultry. In some aspects, the entry portion 410 may be configured such that the outwardly facing lip 460 may be above the poultry's beak as they access the poultry feed.

Figure 5:
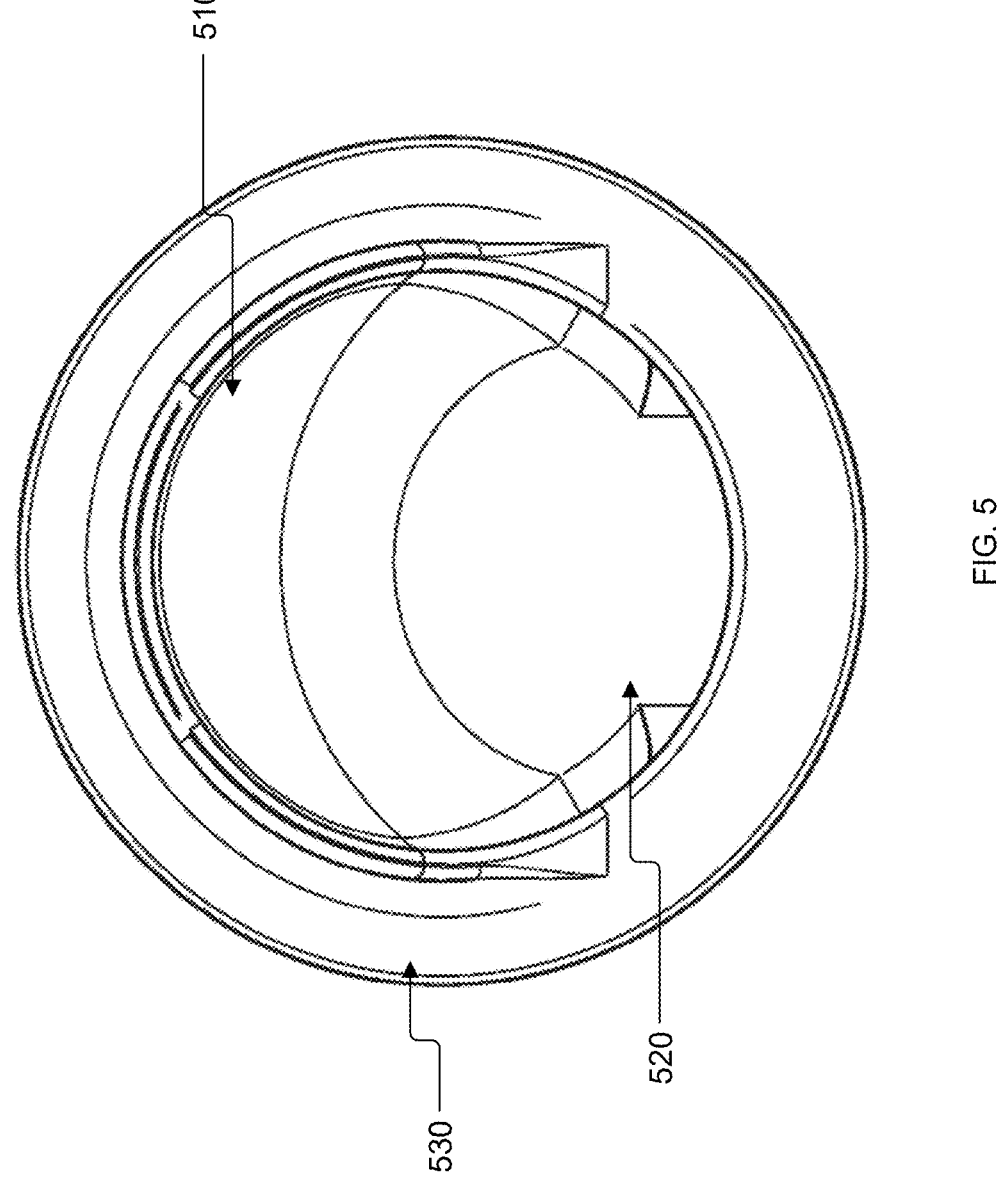
FIG. 5 illustrates a front view of a feeder port, according to some embodiments of the present disclosure.

Referring now to FIG. 5, a front view of a feeder port 500, according to some embodiments of the present disclosure, is illustrated. In some embodiments, the feeder port 500 may include a tubular body with an internal cavity, an entry portion 510, an exit portion 520, an external threading, and a collar 530. In some aspects, the feeder port 500 may include a waterproof seal between the collar 530 and the external threading. In some implementations, a bushing may be connected to the external threading, wherein the bushing may be configured to secure the feeder port 500 in place. In some aspects, the feeder port 500 may include a rigid material.

In some embodiments, the entry portion 510 may provide access to the internal cavity in the tubular body. In some aspects, the internal cavity may extend from the entry portion 510 to the exit portion 520. In some implementations, the entry portion 510 may encompass a base of the tubular body. In some aspects, the exit portion 520 may be included on the side of the tubular body opposite of the entry portion 510. In some implementations, the feeder port 500 may be configured to face the exit portion 520 downwards.

Figure 6:
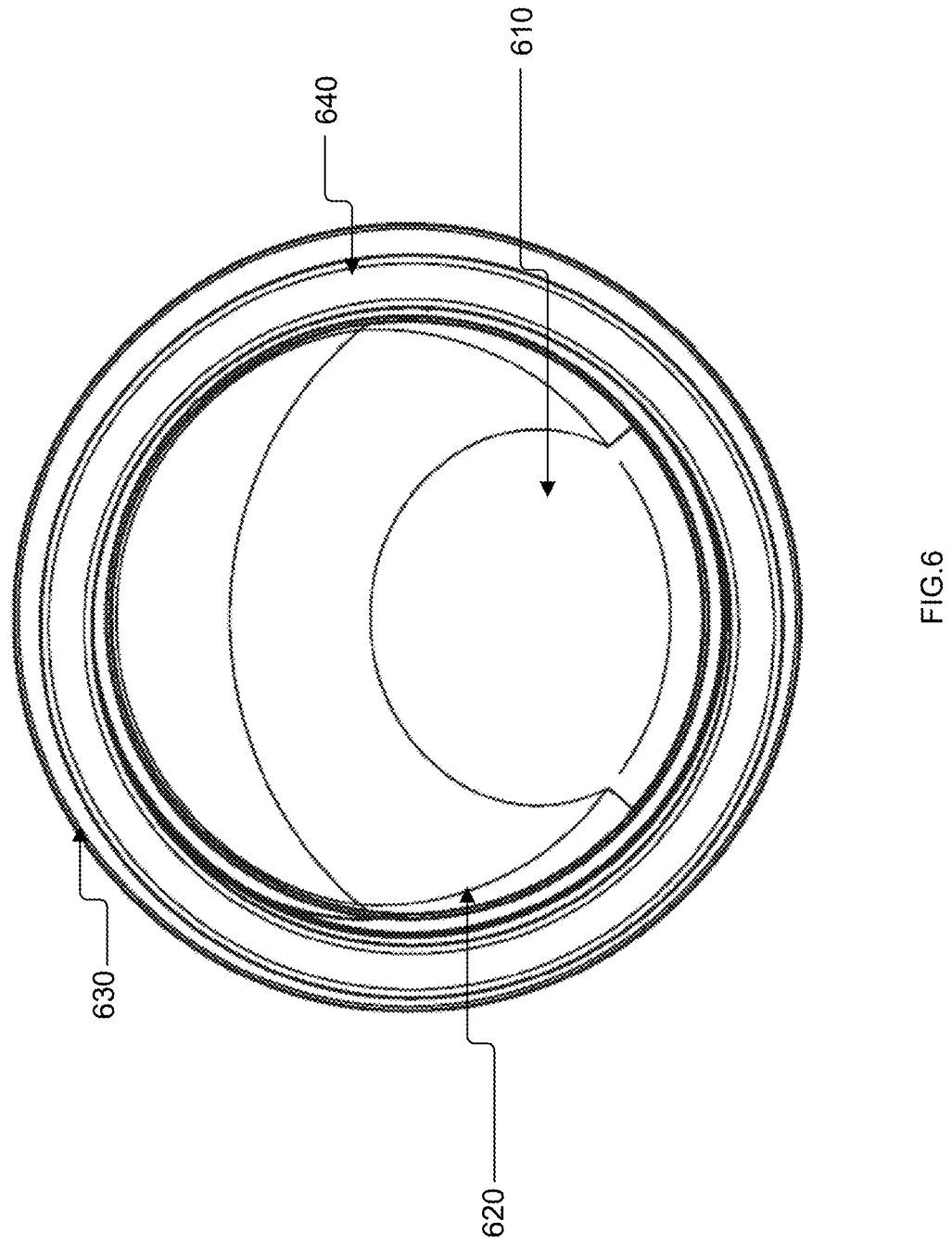
FIG. 6 illustrates a rear view of a feeder port, according to some embodiments of the present disclosure.

Referring now to FIG. 6, a rearview of a feeder port, according to some embodiments of the present disclosure, is illustrated. In some embodiments, the feeder port 600 may include a tubular body with an internal cavity, an entry portion 610, an exit portion 620, an external threading, and a collar 630. In some aspects, the feeder port 600 may include a waterproof seal 640 between the collar 630 and the external threading. In some implementations, a bushing may be connected to the external threading, wherein the bushing may be configured to secure the feeder port 600 in place. In some aspects, the feeder port 600 may include a rigid material.

By way of example and not limitation, the feeder port 600 may be coupled to an aperture on a trough that may be configured to contain poultry feed. In some aspects, the entry portion 610 may include an outwardly facing lip and the exit portion 620 may face downward into the trough. In some implementations, the collar may be larger than the aperture, wherein only a portion of the feeder port 600 may be inside the trough while the other portion is outside of the trough. In some aspects, the exit portion 620 and the external threading may be located inside the trough whereas the collar and entry portion 610 may be located outside the trough. In some aspects, the bushing may be secured on the inside of the trough to keep the feeder port 600 in place.

Figure 7:
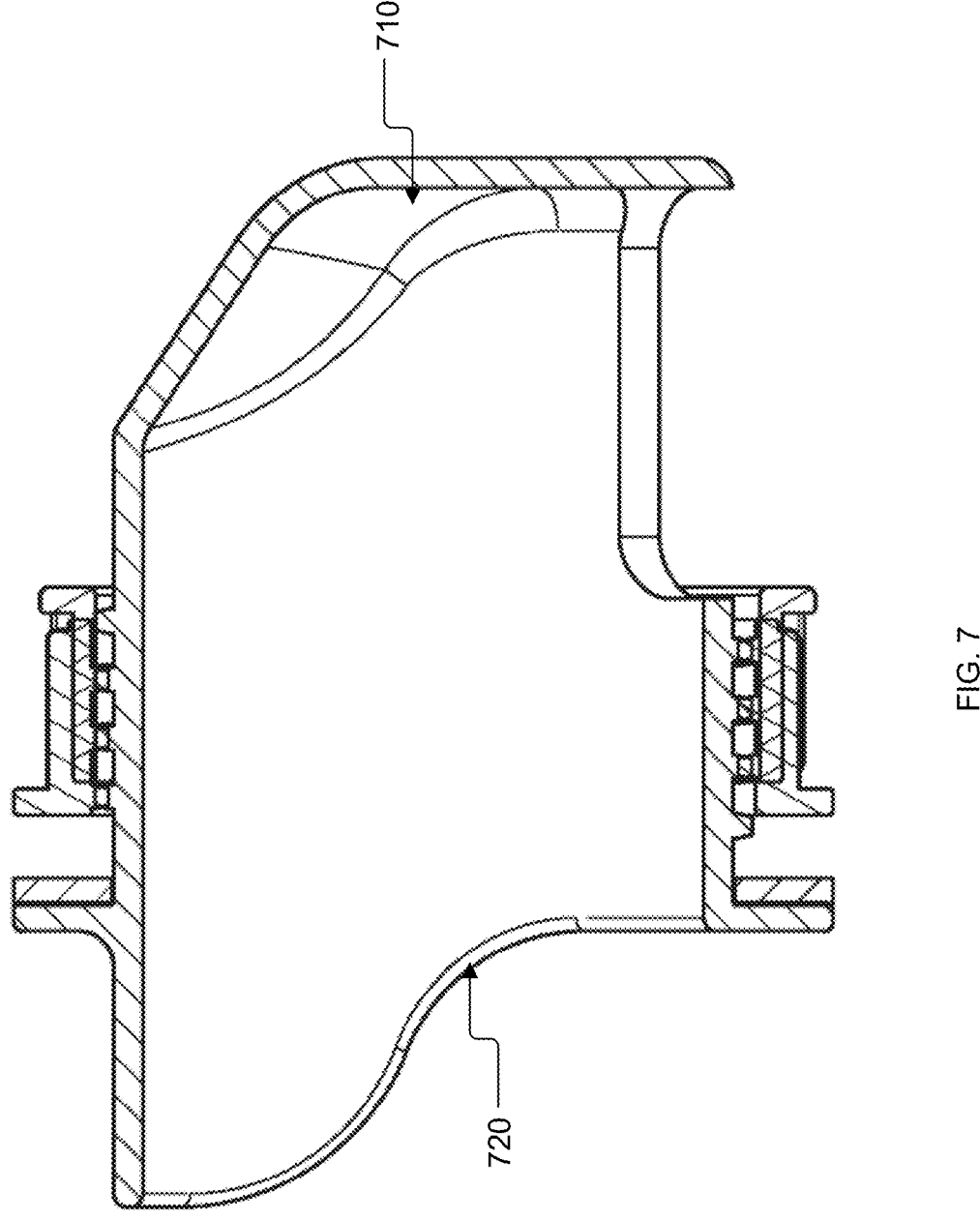
FIG. 7 illustrates a side cross-sectional view of a feeder port, according to some embodiments of the present disclosure.

Referring now to FIG. 7, a side cross-sectional view of a feeder port 700, according to some embodiments of the present disclosure, is illustrated. In some embodiments, the feeder port 700 may include a tubular body with an internal cavity, an entry portion 710, an exit portion 720, an external threading, and a collar. In some aspects, the feeder port 700 may include a waterproof seal between the collar and the threaded material. In some implementations, a bushing may be connected to the external threading, wherein the bushing may be configured to secure the feeder port 700 in place. In some aspects, the feeder port 700 may include a rigid material.

Figure 8:
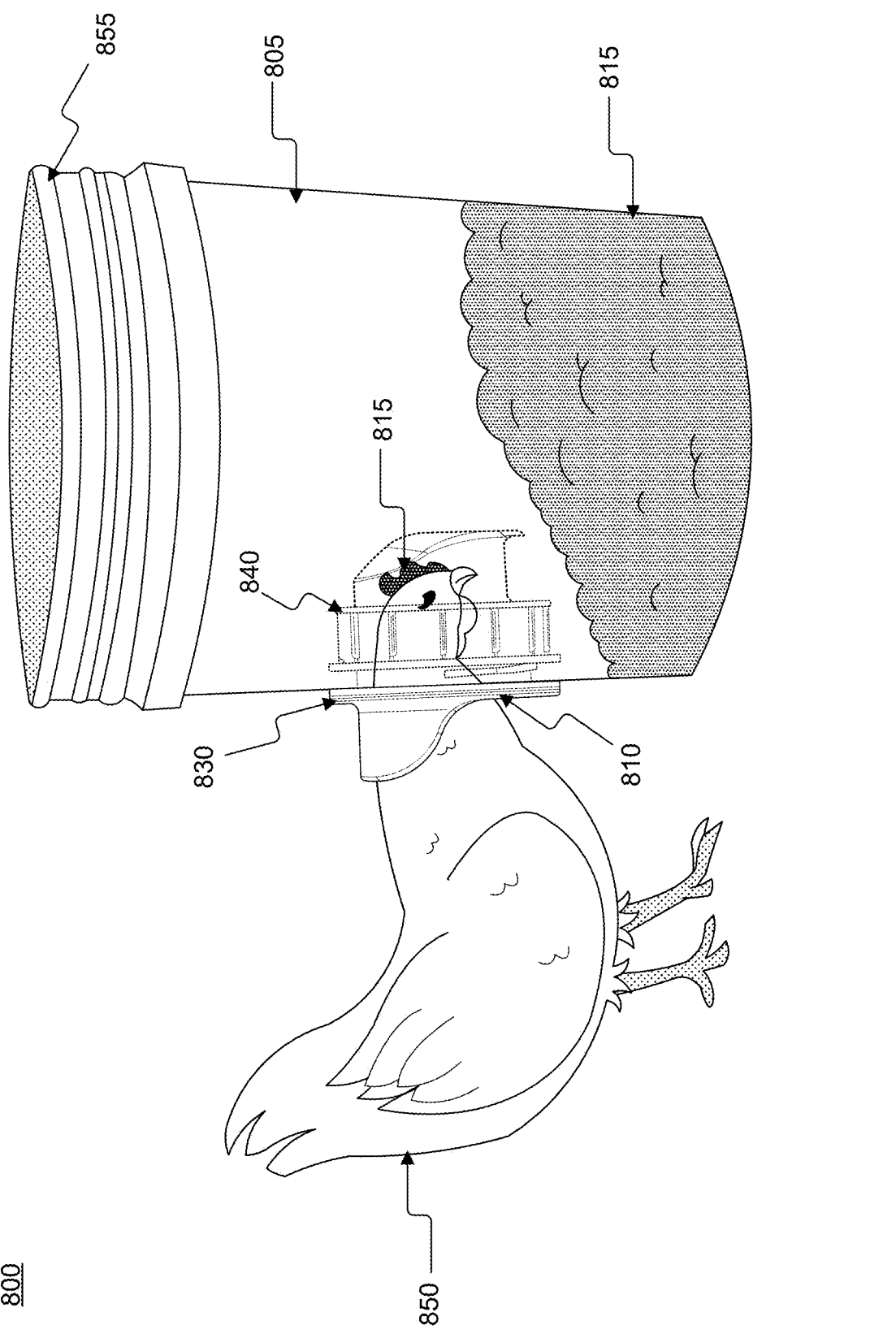
FIG. 8 illustrates a feeder port with a feeder trough, according to some embodiments of the present disclosure.

Referring now to FIG. 8, a feeder port 800 with a feeder trough 805, according to some embodiments of the present disclosure, is illustrated. In some embodiments, the feeder port 800 may include a tubular body with an internal cavity, an entry portion 810, an exit portion 820, an external threading, and a collar 830. In some aspects, the feeder port may include a waterproof seal between the collar 830 and the external threading. In some implementations, a bushing 840 may be connected to the external threading, wherein the bushing 840 may be configured to secure the feeder port 800 in place. In some aspects, the feeder port 800 may include a rigid material.

In some implementations, the feeder trough 805 may be a trough configured to contain poultry feed 815. In some aspects, the feeder trough 805 may include an aperture configured to receive the feeder port 800, wherein a portion of the feeder port 800 may be on the inside of the feeder trough 805 and another portion of the feeder port 800 may be located on the outside of the feeder trough 805. In some embodiments, the entry portion 810 and the collar 830 may be located outside of the feeder trough 805. In some aspects, the exit portion 820, the external threading, and the bushing 840 may be located on the inside of the feeder trough 805.

By way of example and not limitation, poultry 850 may place their heads through the feeder port 800 to access the poultry feed 815. In some aspects, the exit portion 820 may be located on the opposite base of the tubular body from the entry portion 810. In some implementations, the top of the feeder trough 805 may be closed by a lid 855. In some aspects, the lid 855 may be removed, wherein the poultry feed 815 may be refilled. By way of example and not limitation, the feeder port 800 may be attached to the feeder trough 805 by removing the lid 855 and screwing on the bushing 840 onto the external threading of the tubular body that may be protruding into the feeder trough 805.

Figure 9:
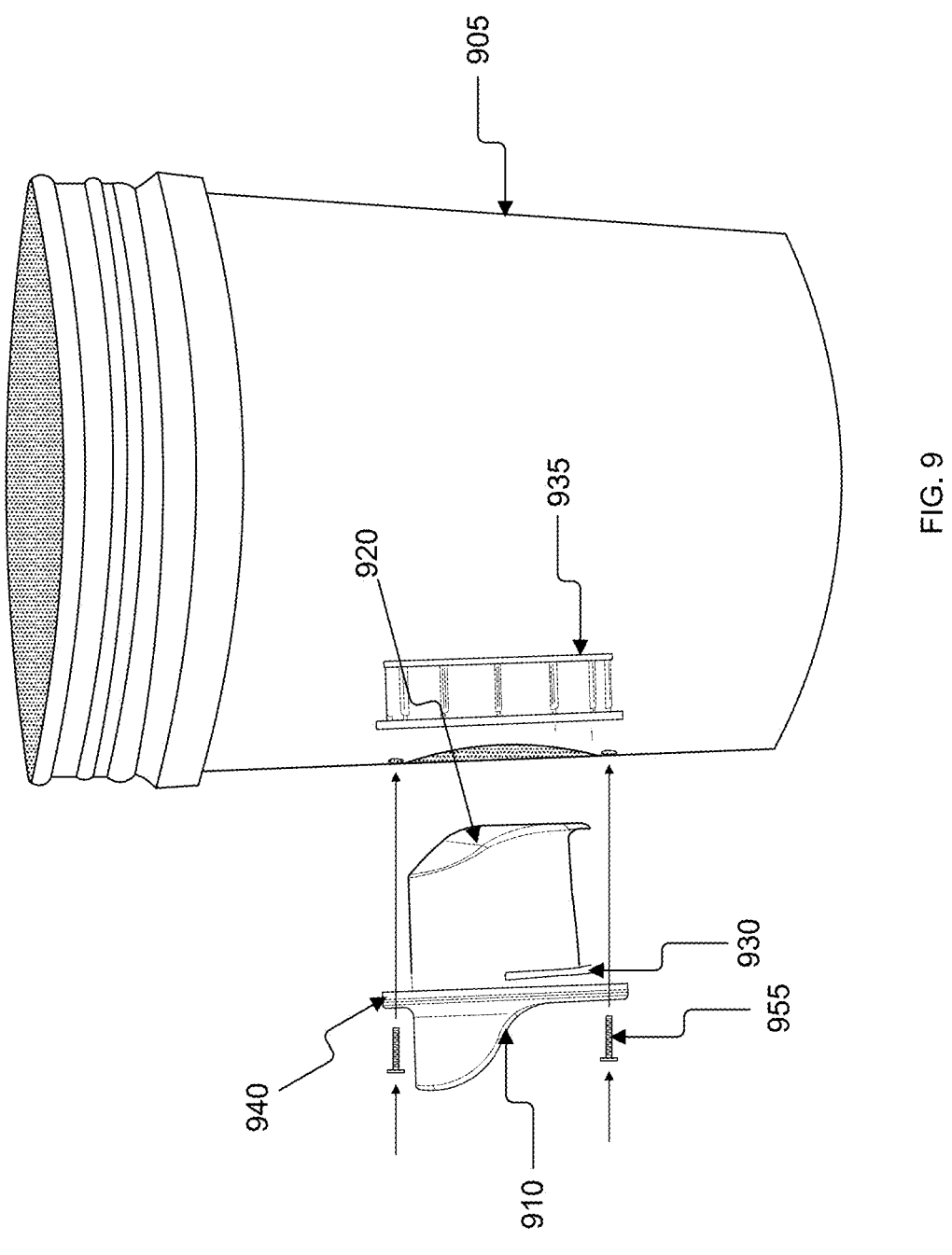
FIG. 9 illustrates a feeder port with a feeder trough, according to some embodiments of the present disclosure.

Referring now to FIG. 9, a feeder port 900 with a feeder trough 905, according to some embodiments of the present disclosure, is illustrated. In some embodiments, the feeder port 900 may include a tubular body with an internal cavity, an entry portion 910, an exit portion 920, an external threading 930, and a collar 940. In some aspects, the feeder port 900 may include a waterproof seal between the collar 940 and the external threading 930. In some implementations, a bushing 935 may be connected to the external threading 930, wherein the bushing 935 may be configured to secure the feeder port 900 in place. In some aspects, the feeder port 900 may include a rigid material.

In some implementations, the feeder trough 905 may be a trough configured to contain poultry feed. In some aspects, the feeder trough 905 may include an aperture 950 configured to receive the feeder port 900, wherein a portion of the feeder port 900 may be on the inside of the feeder trough 905 and another portion of the feeder port 900 may be located on the outside of the feeder trough 905. In some embodiments, the entry portion 910 and the collar 930 may be located outside of the feeder trough 905. In some aspects, the exit portion 920, the external threading 930, and the bushing 935 may be located on the inside of the feeder trough 905.

In some embodiments, the collar 940 may include one or more securing mechanisms 955. By way of example and not limitation, the one or more securing mechanisms 955 may include screws, caps, or pins. In some aspects, the feeder port 900 may be attached to the feeder trough 905, wherein the one or more securing mechanisms 955 may be configured to secure the collar 940 to the external surface of the feeder trough 905. By way of example and not limitation, the one or more securing mechanisms 955 may provide additional support to the feeder port 900, wherein the bushing 935 and the one or more securing mechanisms 955 secures the feeder port 900 to the feeder trough 905. In some aspects, the one or more securing mechanism 955 may secure the feeder port 900 to the feeder trough 905 without the bushing 935.

Figure 10:
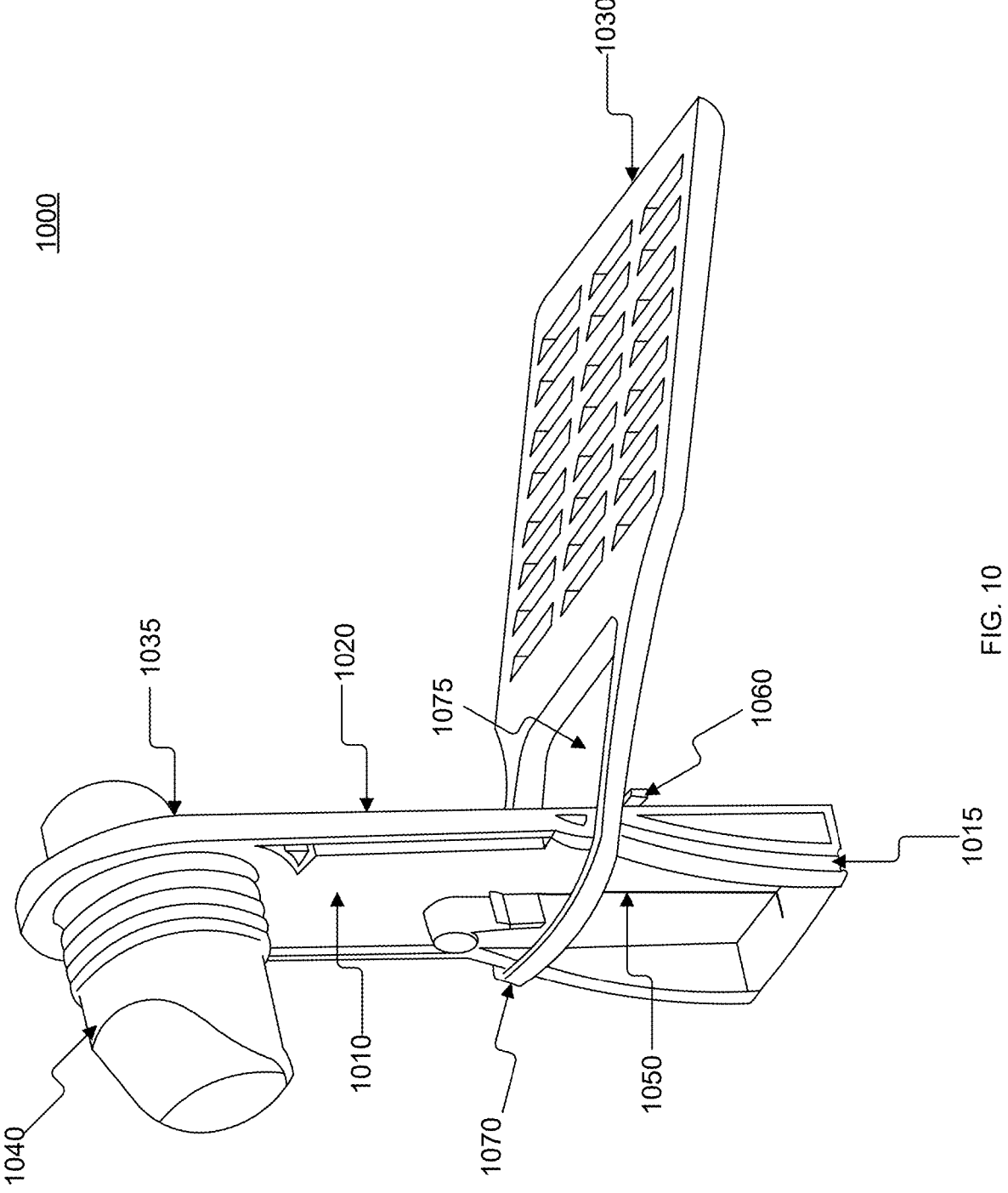
FIG. 10 illustrates a gate mechanism for a feeder port, according to some embodiments of the present disclosure

Referring now to FIG. 10, a gate mechanism for a feeder port, according to some embodiments of the present disclosure, is illustrated. In some embodiments, a gate mechanism 1000 may include a support structure 1010, a sliding door 1020, and a platform 1030. In some implementations, the support structure 1010 may be vertically oriented with an opening configured to connect to a collar of a feeder port 1040 and an end opposite of the opening configured to stabilize the gate mechanism 1000. In some implementations, the support structure 1010 may include platform tracks 1015 and sliding tracks configured to receive a sliding door 1020.

In some embodiments, the sliding door 1020 may be attachable to the sliding door tracks 1050 of the support structure 1010, wherein the sliding door 1020 may be configured to allow or block access to an entry portion 1035 of the feeder port 1040. In some aspects, the platform 1030 may be attachable to the sliding door 1020, wherein putting pressure on the platform 1030 may be configured to move the sliding door 1020 downwards on the sliding door tracks 1050 to allow access into the feeder port 1040.

In some embodiments, the sliding door 1020 may include one or more leverage portions 1060, wherein the one or more leverage portions 1060 may be configured to protrude from the sides of a bottom portion of the sliding door 1020. In some aspects, the one or more leverage portions 1060 may be configured to receive the platform 1030. In some implementations, the platform 1030 may include an attachment portion 1070 defined by a hole 1075 that may be placed over the support structure 1010, wherein the attachment portion 1070 may rest against the one or more leverage portions 1060. In some embodiments, a portion of the platform 1030 opposite of the attachment portion 1070 may touch the ground, wherein the platform 1030 may be diagonally lifted by the one or more leverage portions 1060. By way of example and not limitation, the platform 1030 may be diagonally elevated from a surface, wherein putting pressure on the platform 1030 may push its elevated portion to the surface.

In some aspects, placing a predetermined amount of pressure on the platform 1030 may be configured to push the platform 1030 onto the ground, the attachment portion 1070 pulling the sliding door 1020 downwards, wherein the sliding door 1020 may slide below the feeder port 1040 to provide access. By way of example and not limitation, the feeder port 1040 may be connected as the entryway to a feeder for farm animals, wherein the gate mechanism 1000 keeps the feeder port 1040 blocked until pressure may be exerted upon the gate mechanism 1000, wherein a farm animal may step on the platform 1030 to access and consume feed through the feeder port 1040. In some aspects, the weight of the farm animals on the platform 1030 may be configured to provide access to feed within the feeder 1080 through the feeder port 1040.

Figure 11:
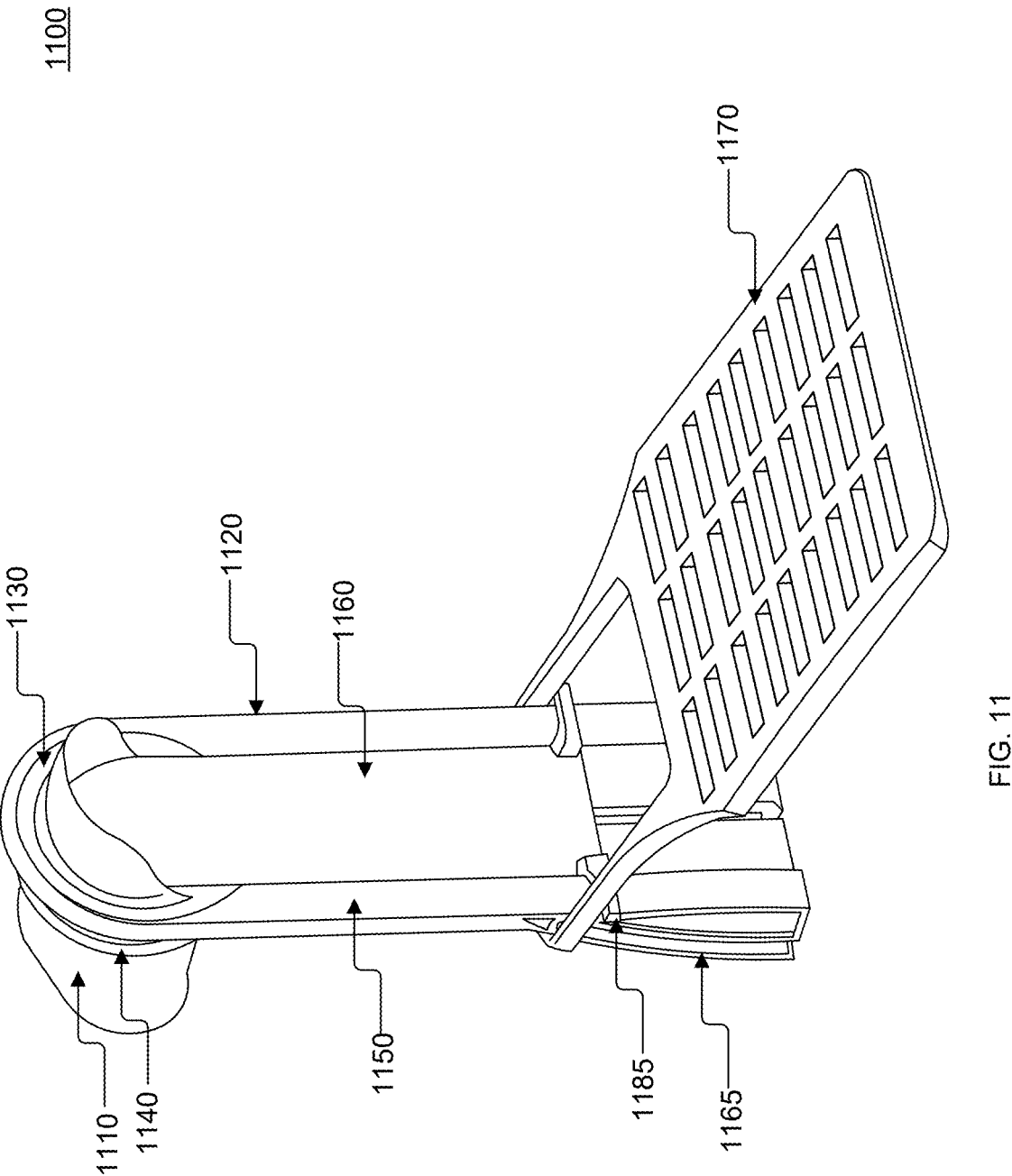
FIG. 11 illustrates a feeder port system, according to some embodiments of the present disclosure.

Referring now to FIG. 11, a feeder port system, according to some embodiments of the present disclosure, is illustrated. In some embodiments, the feeder port system 1100 may be configured to provide an entryway for a feeder. In some implementations, the feeder port system 1100 may include a feeder port 1110 and a gate mechanism 1120 attachable to the feeder port 1110.

In some embodiments, the feeder port 1110 may have a tubular body with an entry portion and an exit portion. In some aspects, the feeder port 1110 may include a collar 1130 that protrudes from around the tubular body between the entry portion and the exit portion. In some aspects, the feeder port 1110 may include an external threading 1140 on the tubular body between the collar 1130 and the exit portion.

In some embodiments, the feeder port 1110 may be configured to receive the gate mechanism 1120, wherein the gate mechanism 1120 includes a support structure 1150, a sliding door 1160, and a platform 1170. In some implementations, the gate mechanism 1120 may be configured to provide and deny access to the entry portion of the feeder port 1110. In some aspects, the support structure 1150 may be vertically oriented with an opening to connect to the collar 1130 of the feeder port 1110, wherein the support structure 1150 may include platform tracks 1165 and sliding door tracks configured to receive a sliding door 1160.

In some implementations, the platform tracks 1165 may be configured as the base of the support structure 1150, wherein the platform tracks 1165 may include legs, platforms, or a thicker surface area, as non-limiting examples, wherein the platform tracks 1165 may be configured to stabilize and hold the support structure 1150 in place. In some aspects, the sliding door tracks may be configured to receive the sliding door 1160, wherein the sliding door 1160 includes one or more sliding doors configured to attach to the sliding door tracks, wherein the sliding doors may be configured to move along the sliding door tracks.

In some embodiments, the gate mechanism 1120 may include a platform 1170 attachable to the sliding door 1160, wherein putting weight on the platform 1170 may be configured to move the sliding door 1160 downwards on the sliding door tracks to allow access into the feeder port 1110. In some aspects, the platform 1170 may be a relatively flat plate, wherein a portion of the platform 1170 that may interface with the sliding door 1160 includes a circular hole configured to loosely wrap around the sliding door and support structure, wherein the edges of the circular hole may connect with one or more leverage portions 1185 of the sliding door 1160.

Figure 12:
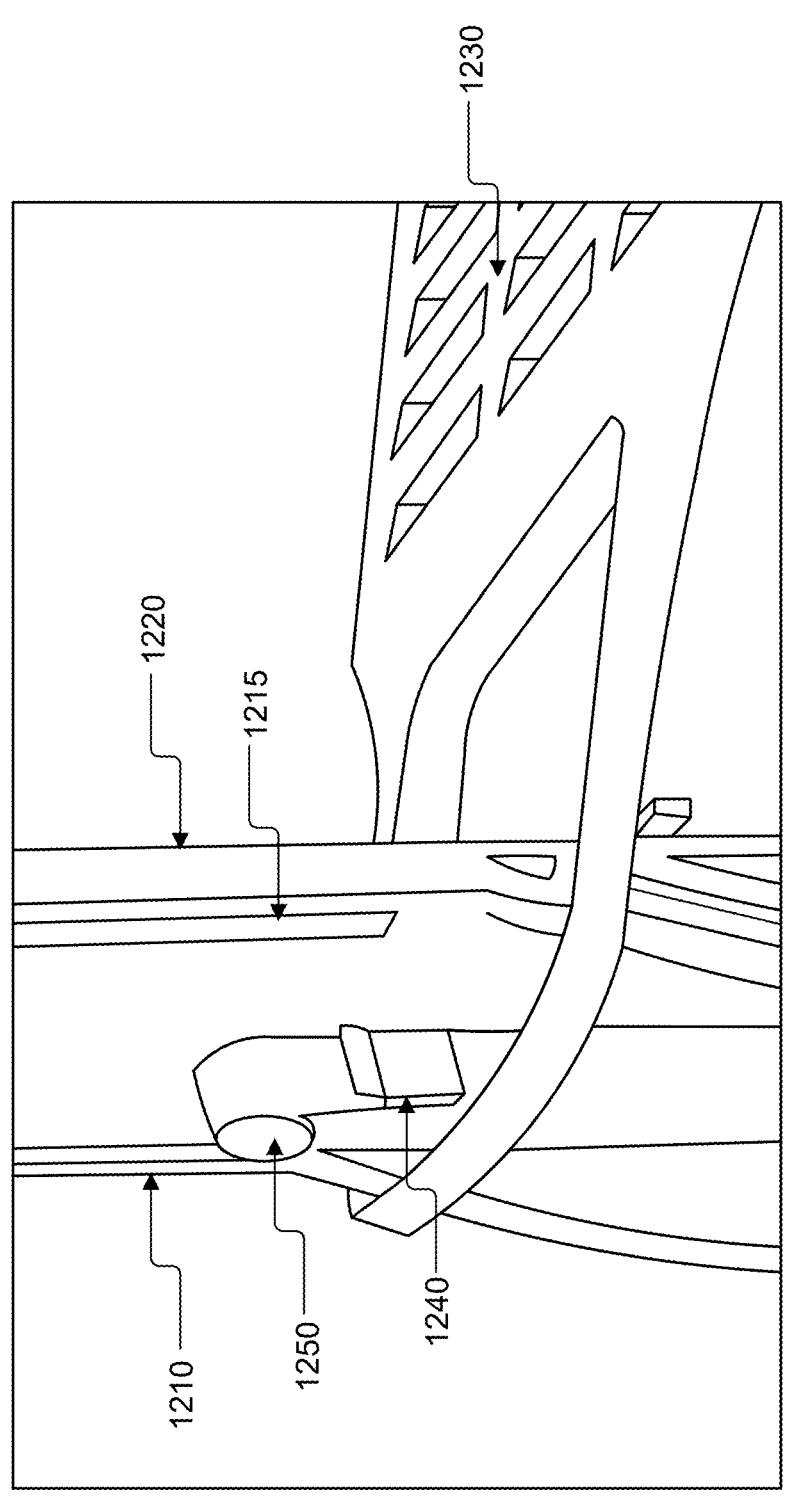
FIG. 12 illustrates a back view of the gate mechanism, according to some embodiments of the present disclosure.

Referring now to FIG. 12, a back view of the gate mechanism, according to some embodiments of the present disclosure, is illustrated. In some embodiments, the gate mechanism 1200 may include a support structure 1210, a sliding door 1220, and a platform 1230. In some embodiments, the support structure 1210 may include sliding door tracks 1215, wherein the sliding door tracks 1215 may be configured to receive a portion of the sliding door 1220.

In some embodiments, the support structure 1210 may include a pulley mechanism 1240, wherein the pulley mechanism 1240 may be wrapped around a anchor mechanism 1250 between platform tracks 1260 on the support structure 1210. In some aspects, the pulley mechanism 1240 may be attachable to a portion of the sliding door 1220, wherein the pulley mechanism 1240 may be pulled by the anchor mechanism 1250. In some implementations, the anchor mechanism 1250 may be configured to apply pressure such that the sliding door 1220 remains upwards on the support structure 1210 to block access to a feeder port. In some embodiments, the force exerted on the platform 1230 may be more than the force exerted by the anchor mechanism 1250, wherein the sliding door 1220 may move downwards to provide access to the feeder port.

Figure 13:
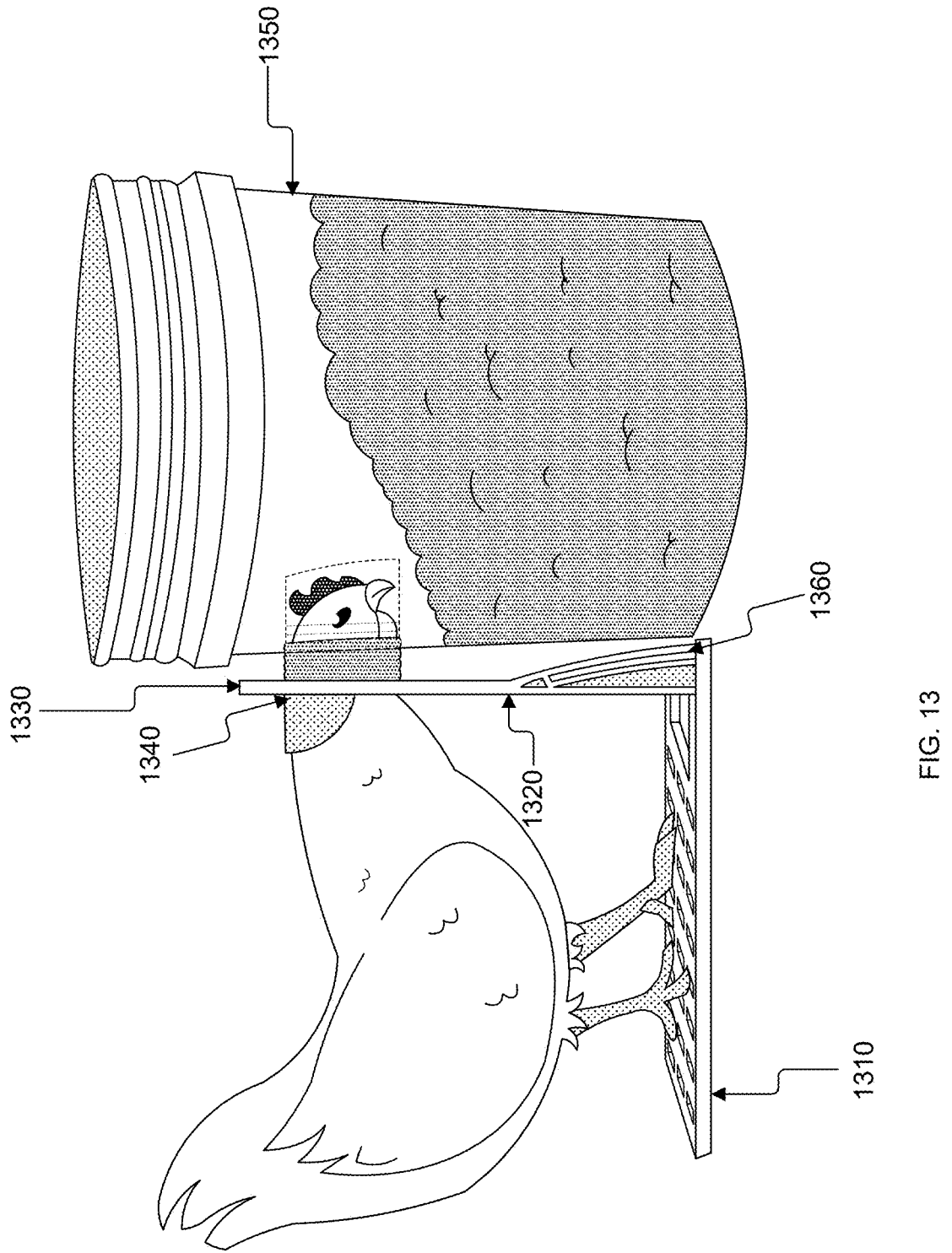
FIG. 13 illustrates a farm animal using a feeder port system, according to some embodiments of the present disclosure.

Referring now to FIG. 13, a farm animal using a feeder port system, according to some embodiments of the present disclosure, is illustrated. In some embodiments, a farm animal may step onto a platform 1310, wherein the platform 1310 may be configured to move a sliding door 1320 downward. In some aspects, the sliding door 1320 may be attachable to a support structure 1330, wherein the support structure 1330 may be attachable to a feeder port 1340. In some implementations, the farm animal's weight may push the platform 1310 down resulting in the downward motion of the sliding door 1320 to reveal an entry portion to the feeder port 1340.

In some embodiments, the feeder port 1340 and a gate mechanism may be attachable to a feeding container 1350, wherein the gate mechanism may include platform tracks 1360 configured to connect to the feeding container 1350. In some aspects, the farm animal may be able to consume feed in the feeding container 1350, wherein when the farm animal steps off the platform 1310, the gate mechanism 1300 may close off access to the feeder port 1340. In some aspects, the feeding container 1350 may be a 5-gallon bucket, as a non-limiting example.

Figure 14:
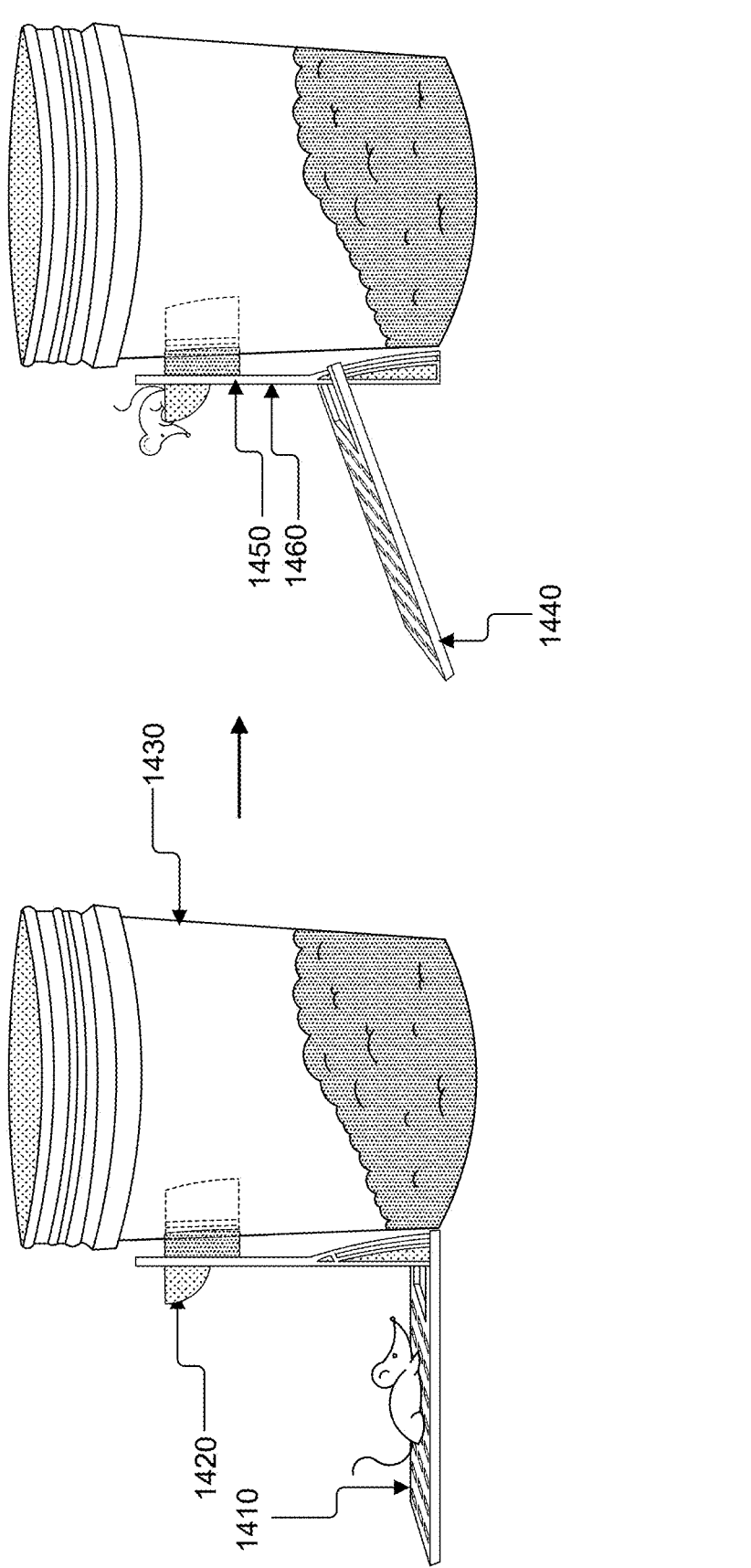
FIG. 14 illustrates a feeder port system, according to some embodiments of the present disclosure.

Referring now to FIG. 14, a feeder port system, according to some embodiments of the present disclosure, is illustrated. In some embodiments, a rodent or pest 1410 may attempt to access a feeder port 1420 connected to a feeding container 1430 to access feed in the feeding container 1430. In some aspects, the rodent or pest 1410 may step on the platform 1440, opening a gate mechanism 1450 configured to provide and block entry into the feeder port 1420, wherein the pest or rodent 1410 may not be able to reach the feeder port 1420 while positioned on the platform 1440.

In some aspects, the weight required to force the platform 1440 downwards may be beyond the weight of any rodent or pest 1410. In some implementations, if the rodent or pest 1410 steps off the platform 1440, the sliding door 1460 may continue to block off access into the feeder port 1420. By way of example and not limitation, the rodent or pest 1410 may be prevented access to the feeding container 1430 by the gate mechanism 1450, wherein only farm animals may access the contents of the feeding container 1430.

Figure 15:
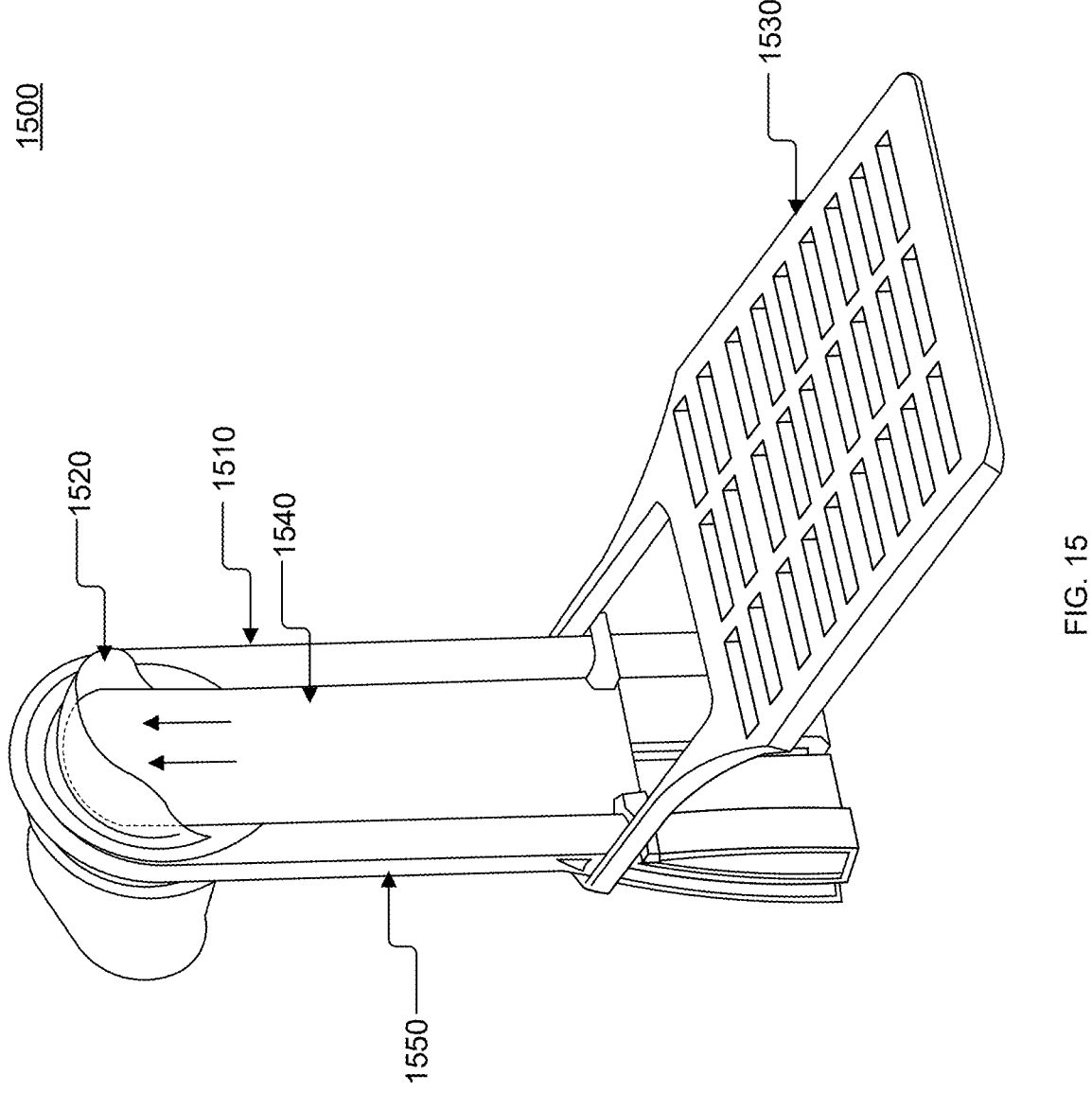
FIG. 15 illustrates a feeder port system, according to some embodiments of the present disclosure.

Referring now to FIG. 15, a feeder port system, according to some embodiments of the present disclosure, is illustrated. In some aspects, a feeder port system 1500 may include a gate mechanism 1510 and a feeder port 1520, wherein the gate mechanism 1510 may be configured to block access to the feeder port 1520 unless a predetermined amount of weight may be applied to a platform 1530 connected to a sliding door 1540 of the gate mechanism 1510, wherein the sliding door 1540 includes a portion that rests in a position that blocks the feeder port 1520 but may be configured to slide downwards when the platform 1530 may receive pressure. In some aspects, a supporting structure 1550 may receive the sliding door 1540 and the platform 1530 and connect to the feeder port 1520.

Conclusion

A number of embodiments of the present disclosure have been described. While this specification contains many specific implementation details, these should not be construed as limitations on the scope of any disclosures or of what may be claimed, but rather as descriptions of features specific to particular embodiments of the present disclosure.

Certain features that are described in this specification in the context of separate embodiments can also be implemented in combination or in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described components and systems can generally be integrated together in a single product or packaged into multiple products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

Reference in this specification to "one embodiment," "an embodiment," any other phrase mentioning the word "embodiment", "aspect", or "implementation" means that a particular feature, structure, or characteristic described in connection with the embodiment is included in at least one embodiment of the disclosure and also means that any particular feature, structure, or characteristic described in connection with one embodiment can be included in any embodiment or can be omitted or excluded from any embodiment. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others and may be omitted from any embodiment. Furthermore, any particular feature, structure, or characteristic described herein may be optional.

Similarly, various requirements are described which may be requirements for some embodiments but not other embodiments. Where appropriate any of the features discussed herein in relation to one aspect or embodiment of the invention may be applied to another aspect or embodiment of the invention. Similarly, where appropriate any of the features discussed herein in relation to one aspect or embodiment of the invention may be optional with respect to and/or omitted from that aspect or embodiment of the invention or any other aspect or embodiment of the invention discussed or disclosed herein.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

What is claimed is:

1. A gate mechanism configured to provide and deny access to the entry portion of a feeder port, wherein the gate mechanism includes:

a support structure that is vertically oriented with an aperture to connect to a collar of a feeder port, wherein the support structure includes one or more stabilizing mechanisms and one or more tracks configured to receive a sliding portion;

the sliding portion attachable to the one or more tracks, wherein the sliding portion is configured to allow and block access to the feeder port; and a pressure mechanism attachable to the sliding portion, wherein pressing the pressure mechanism is configured to move the sliding portion downwards on the one or more tracks to allow access into the feeder port, wherein the one or more tracks includes a leash mechanism configured to wrap around a holding mechanism above the one or more tracks; wherein the leash mechanism is attachable to a portion of the sliding portion that protrudes through one or more tracks, wherein the leash mechanism is pulled by the holding mechanism.

2. The gate mechanism of claim 1, wherein the sliding portion includes one or more leverage portions, wherein the one or more leverage portions are configured to protrude from the sides of a bottom portion of the sliding portion.

3. The gate mechanism of claim 2, wherein the one or more leverage portions are configured to receive an attachment portion of the pressure mechanism.

4. The gate mechanism of claim 3, wherein the attachment portion of the pressure mechanism is defined by an opening that is placed over the support structure, wherein the attachment portion is configured to rest against the one or more leverage portions and pressing the pressure portion puts force on the sliding portion to provide access to the feeder port.

5. The gate mechanism of claim 1, wherein the pressure mechanism is diagonally elevated from a surface, wherein the pressure mechanism includes an elevated portion that is configured to be pushed toward the surface when pressure is applied.

6. The gate mechanism of claim 1, wherein the feeder port is connectable to a feeder for farm animals, wherein the gate mechanism is configured to keep the feeder port blocked until pressure is exerted upon the gate mechanism.

7. The gate mechanism of claim 6, wherein the farm animals' weight on the pressure mechanism is configured to provide access to feed within the feeder through the feeder port.

8. The gate mechanism of claim 1, wherein the holding mechanism is configured to apply pressure such that the sliding portion remains upwards on the support structure to block access to the feeder port.

9. The gate mechanism of claim 1, wherein if the force exerted on the pressure mechanism is more than the force exerted by the holding mechanism on the leash mechanism, the sliding portion is configured to move downwards to provide access to the feeder port.

10. The gate mechanism of claim 1, wherein the gate mechanism is configured to prevent rodents and pests from accessing the feeder port.

11. A feeder port system configured to provide an entryway for a feeder including:

a feeder port with a tubular body with an entry portion and an exit portion, wherein the feeder port further includes:

a collar that protrudes around the tubular body between the entry portion and exit portion;

an external threading on the tubular body between the collar and the exit portion;

a gate mechanism configured to provide and deny access to the entry portion of the feeder port, wherein the gate mechanism includes:

a support structure that is vertically oriented with an aperture to connect to the collar of the feeder port, wherein the support structure includes one or more stabilizing mechanisms and one or more tracks configured to receive a sliding portion;

the sliding portion attachable to the one or more tracks, wherein the sliding portion is configured to allow and block access to the feeder port; and a pressure mechanism attachable to the sliding portion, wherein pressing the pressure mechanism is configured to move the sliding portion downwards on the one or more tracks to allow access into the feeder port.

12. The feeder port system of claim 11, wherein the feeder is a 5-gallon bucket.

13. The feeder port system of claim 11, wherein the pressure mechanism is a flat plate configured to interface with the sliding portion, wherein a portion of the pressure mechanism includes a circular hole configured to wrap around the sliding portion and support structure.

14. The feeder port system of claim 13, wherein the edge of the circular hole is configured to connect with one or more leverage portions of the sliding portion, wherein the one or more leverage portions are located at a bottom portion of the sliding mechanism.

15. The feeder port system of claim 11, wherein the one or more tracks includes a leash mechanism configured to wrap around a holding mechanism above the one or more tracks.

16. The feeder port system of claim 15, wherein the leash mechanism is attachable to a portion of the sliding portion that protrudes through one or more tracks, wherein the leash mechanism is pulled by the holding mechanism.

17. The feeder port system of claim 16 wherein the holding mechanism is configured to apply pressure such that the sliding portion remains upwards on the support structure to block access to the feeder port.

18. The feeder port system of claim 11, wherein the support structure is configured to connect to the feeder, wherein the one or more stabilizing mechanisms are attachable to the feeder.

* * * * *